Nov. 3, 1936.  W. H. FRANK ET AL  2,059,986
ELECTRICAL DISTRIBUTION SYSTEM
Filed Feb. 11, 1935  2 Sheets-Sheet 1
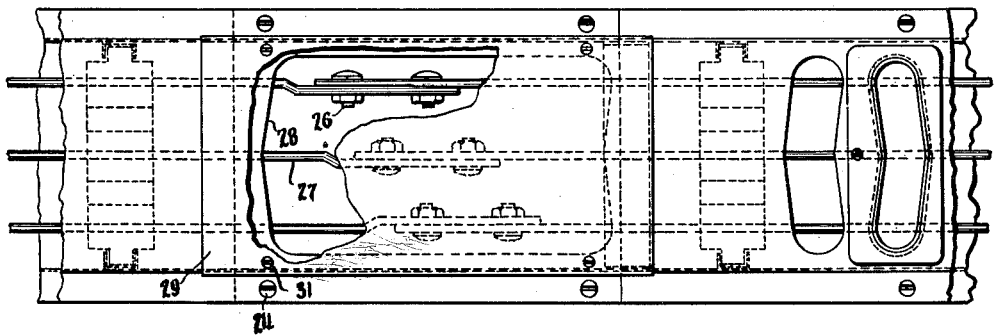
Fig. 1
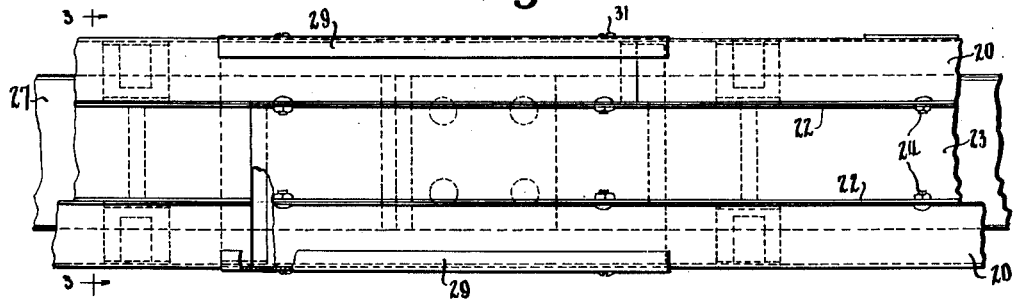
Fig. 2
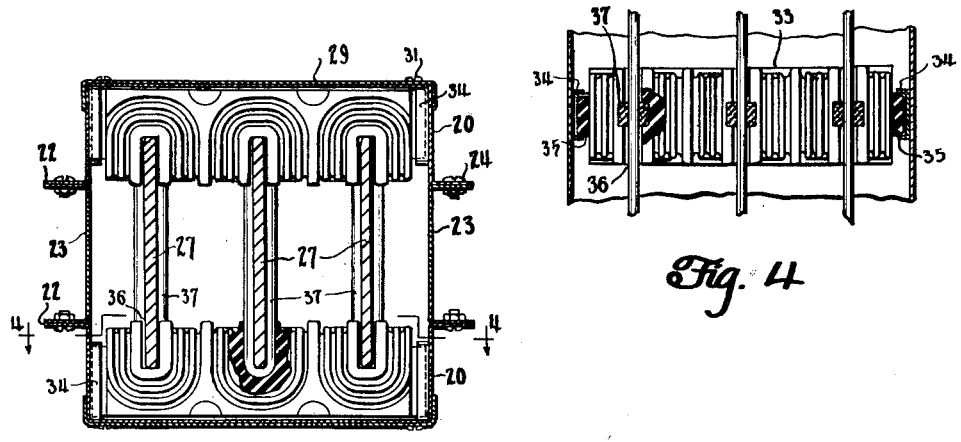
Fig. 3
Fig. 4
INVENTORS.
William H. Frank
Joseph W. Harper.
BY
Daniel G. Cullen
ATTORNEY.

Nov. 3, 1936.  W. H. FRANK ET AL  2,059,986
ELECTRICAL DISTRIBUTION SYSTEM
Filed Feb. 11, 1935   2 Sheets-Sheet 2

INVENTORS
William H. Frank
+ Joseph W. Harper
BY
Daniel G. Cullen
ATTORNEY.

Patented Nov. 3, 1936

2,059,986

UNITED STATES PATENT OFFICE 2,059,986

ELECTRICAL DISTRIBUTION SYSTEM

William H. Frank and Joseph W. Harper, Detroit, Mich.

Application February 11, 1935, Serial No. 5,929

6 Claims. (Cl. 247—3)

This application relates to electrical distribution systems of the bus duct type and discloses novel details of bus duct construction representing improvements over corresponding or similar details of existing bus duct constructions. In a prior application of William H. Frank and Joseph W. Harper, Serial No. 692,910, filed October 9, 1933, there is shown a bus duct forming part of an electrical distribution system and constructed to receive standard plugs of the type shown in that application, and this application relates to that type of bus duct.

A system of the character under consideration includes bus duct runs adapted to receive standard plugs or the like for branch circuits. Inasmuch as the capacities of the bus bars within the duct may vary, the cross sectional areas of the bus bars in the duct may vary and consequently the cross sectional areas of the duct may be varied to accommodate the varying cross sectional areas of bus bars. In order to have all ducts of a system, whether they be of great area for great capacities or of small area for small capacities, so dimensioned so as to receive and accommodate standard plugs, novel details of manufacture have been disclosed herein as alternative arrangements, and it will be understood that these arrangements form a primary and important part of the inventions of this application.

In all these arrangements the underlying principle is the feature that the bus duct, no matter how dimensioned and proportioned, includes one or more standard pan constructions for accommodation of standard plugs. In the illustrated arrangements the capacity of the duct is increased by increasing the depth thereof and this is done by the use of spacers between standard pans.

Inasmuch as standard pans may be utilized to a large extent, it will be observed that economies of manufacture of special duct are assured; standard pans may be utilized to provide conventional bus ducts receiving standard plugs or to provide special bus ducts for receiving standard plugs.

A further improvement relates to a bus duct wherein sheet steel is used for building the major portion of the duct, but wherein aluminum or other non-magnetic material is used for building other portions of the duct, in order to minimize the effects of induction around the bus bars in the duct.

A further improvement relates to a duct wherein certain portions, bus bar supports, and bus bars are supported from fixed structure, and wherein the standard pans form covers, removable to expose the interior of the duct, without disturbing the parts supported from fixed structure.

For an understanding of the details of bus duct construction shown in the appended drawings, reference should be had to the following specification. In these drawings, Figs. 1 and 2 are top plan and elevation views of a fragment of bus duct run equipped with novel details of construction and arranged for the reception of bus bars of great width and capacity and also for the reception of standard plugs, the duct being provided with a non-magnetic metal portion for minimizing the effects of induction;

Fig. 3 is a cross section as if on line 3—3 of Fig. 2;

Fig. 4 is a cross section as if on line 4—4 of Fig. 3;

Figure 5:
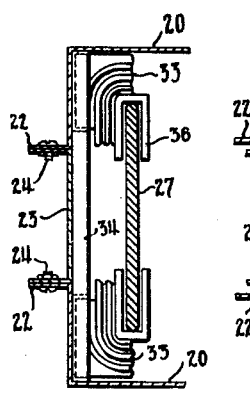
Fig. 5 is a view like Fig. 3 but showing a construction where the bus bar insulators and supports are carried by the central channel sections of a bus duct run of the type of Fig. 3.

Referring to the drawings, it will be observed that Figs. 1–4 show details of construction of a large capacity bus duct wherein the duct comprises outer portions formed of standard pans 20 having flanges 22 connected to one another through a central or spacer portion formed of sheet metal channels 23 disposed between the flanges 22, screw bolts 24 being utilized as the connecting means.

It is intended that the pans 20 be identical with each other and it is readily understandable that they may be joined directly to each other without the intervention of the central portion provided by the channels 23 to form a shallow bus duct, as shown in application Serial No. 692,910. In the bus duct here illustrated, the central portion comprising channels 23 is utilized as a spacer means between the outer portions comprising the pans 20 for the purpose of providing a deeper bus duct than would be the case were the spacer portion omitted. This expedient promotes economy of manufacture without loss of standardization inasmuch as standard pans capable of receiving standard plugs may be utilized to form shallow bus duct or deep bus duct as desired.

It will be observed that one or both of the spacer channels 23 may well be made of sheet material other than the sheet steel which is generally utilized in fabricating the outer portions or pans 20. For example, if one or more of the spacer channels 23 are made of aluminum or other non-magnetic material, the effects of induction around the bus bars will be minimized to a considerable extent.

Within the duct and connected end to end through the medium of scarf lap joints of considerable length to accommodate pairs of screw bolts 26 are bus bars 27, and the purpose of the deep duct is understood when it is observed that the bus bars 27 are of great width to accommodate the great capacities for which they are designed.

To provide access into the duct at the portion thereof where the bolts 26 are positioned so that these bolts may be manipulated for connecting or disconnecting the bus bars, hand holes 28 are formed in the pans 20, and these are large enough to accommodate the hands and tools of a worker. For covering these holes, hand hole covers in the nature of cover pans 29 may be utilized. It will be observed that the screw bolts 31 which secure the hand hole covers 29 to the pans 20 are completely independent of the screws 24 which fasten the portions 20 and 23 together. Because of this detail of construction removal of a hand hole cover may be effected without disturbing the duct in any way.

It will also be observed that the pans 20 and the spacers 23 are made up of standard lengths or sections, and that they are so positioned and dimensioned with respect to one another and with respect to the standard lengths or sections of bus bars that bus bar joints, joints between lengths or sections of spacers 23, and joints between lengths or sections of pans 20, all occur at about the same part of a duct run, for purposes of standardization.

Figure 6:
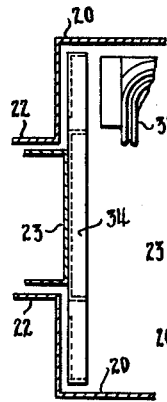
Fig. 6 is an exploded view of the parts of Fig. 5.

As is readily understandable, the bus bars may be supported in the bus duct by means of insulator and supporting plates 33 having their side edges disposed in metal channels 34 integrally secured to the pans 20 (Fig. 3) or to the channels 23 (Figs. 5-6), being cushioned and protected from surface contact therewith by means of the resilient felt liners 35 disposed within the channels 34. The supporting plates are provided with edge grooves or slots 36 in which are disposed the edges of the bus bars, and in order to cushion the bus bars from the insulator plates 33, resilient cushioning means in the nature of rubber bands or rings 37 are provided around the bus bars. In addition to cushioning the bus bars from supporting plates 33, these rubber bands create a great amount of friction between the bus bars and the supporting plates, which friction may be relied upon to prevent relative shifting of the bus bars and the supporting plates; this is especially important in the case of vertical duct runs.

It will be understood at this time that one of the main reasons for utilizing the channels or spacers 23 in connection with standard pans 20 to form a deeper bus duct than would be the case if standard pans alone were used is that this construction permits the use of standard plugs in conjunction with the standard pans, and this would not be the case if other expedients were used when it was found desirable to make a deeper duct than could be attained by the use of standard pans 20 alone.

Figure 9:
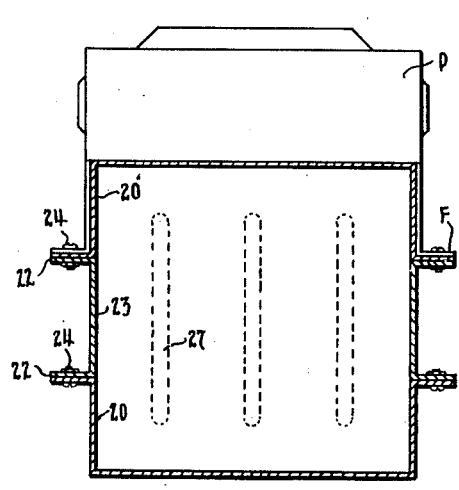
Fig. 9 shows how a duct of the type of Fig. 3 can receive a standard plug.
Figure 10:
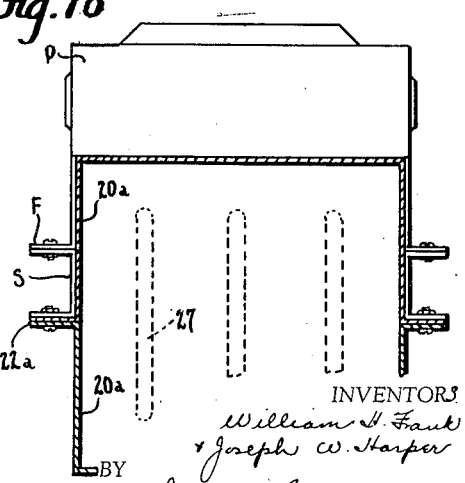
Fig. 10 shows how a differently formed duct can receive a standard plug.

Referring to Figs. 9 and 10, it will be observed that in these figures two different methods of creating a deep duct is shown. In Fig. 9 there is shown a deep duct created by adopting the teachings of Fig. 3, utilizing standard pans 20 having flanges 22 between which are spacers 23 forming a deep duct in which are wide bus bars 27. A standard plug P of the type shown in application Serial No. 692,910, for example, is shown in place on this duct, and since its flanges F are properly dimensioned with respect to the flanges 22 of the standard pans 20, the plug flanges will fit against the pan flanges so that the plug may be secured to the duct by means of the standard screws 24. If, however, a deep duct were fabricated by using deeper pans than the standard pans, as is shown in Fig. 10, where deep pans 20a are combined without the use of spacers 23, a standard plug P having standard flanges F cannot be combined with the deep duct thus fabricated except with the use of auxiliary fillers or shims, such as are shown at S in Fig. 10, to bridge the gap between the plug flanges F and the duct flanges 22a. While the arrangement of Fig. 10 is not here disclaimed, but is intended to be included within the disclosure of this application, it is pointed out that the method of fabricating a deep duct shown in Fig. 9 is the preferred method inasmuch as it promotes economy of manufacture of special duct by reason of the use of standard pans and inasmuch as it permits the use of standard plugs without auxiliary plug parts, as contradistinguished from the construction of Fig. 10 where, for the deep duct fabricated in the manner there shown, not only must special pans be provided but also special shims S must be utilized when standard plugs are to be assembled on the duct.

It will also be observed that the channel-type construction of Figs. 3 and 9 may be utilized to advantage in still another respect, as is not so easily true of the construction of Fig. 10. If the small channels 34 for the bus bar insulators 33 are secured to the channels 23, in the manner shown in Figs. 5-6, rather than to the pans (Fig. 3), and if the bus duct is supported from fixed structure by means attached directly to the channels 23, rather than to the pans, then the pans may be removed from a duct without disturbing the bus bars and their supports, and without disturbing the relation of the duct to fixed structure.

Figure 8:
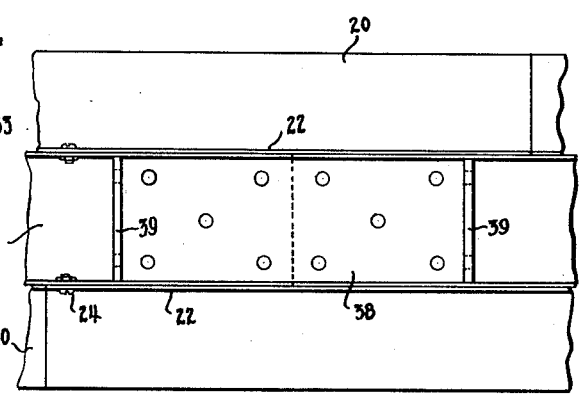
Fig. 8 shows in elevation the use of the juncture plate of Fig. 7.
Figure 7:
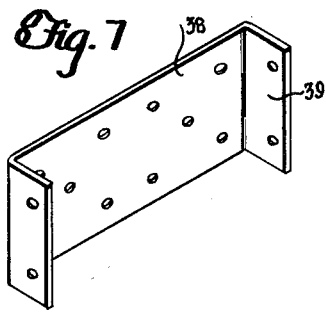
Fig. 7 shows a juncture plate for use with the central channel sections of the duct of Figs. 5–6.

For example, if as is shown in Figs. 7-8 the channels 23 are joined by means of flat plates 38 having flanges 39 provided with bolt holes for cooperation with fixed structure parts, and if the duct is supported from fixed structure by means connected to the flanges 39 of the plates 38, then the pans 20 may be removed from a bus duct run without affecting the bus bars, the insulators 33, or the channels 23, all of which parts remain connected to fixed structure.

We claim:

1. In an electrical distribution system of the type employing bus duct with which are associated branch circuit plugs, the combination of standard cover parts which may be combined to form standard bus duct runs for interchangeably accommodating standard plugs, and special spacer parts which when combined with the standard cover parts form special bus duct runs of larger capacity than the standard bus duct runs, the combination of the standard cover parts and the special spacer parts producing bus duct runs which though of larger capacity than the standard bus duct runs can nevertheless accommodate standard plugs interchangeably and without modification of the plugs.

2. In an electrical distribution system, a bus duct run including central spacer sections, duplicated identical cover pans on opposite sides thereof, each formed with plug entrances and plug mounting formations, bus bar insulators and supports in the cover pans, and bus bars supported on said supports and accessible for plug prong engagement through the plug entrances.

3. In an electrical distribution system of the type employing bus duct with which are associated branch circuit plugs, the combination of duplicated identical standard cover parts which may be combined to form standard bus duct runs for interchangeably accommodating standard plugs, each part having plug entrances and plug mounting formations, and special spacer parts between the standard cover parts which when combined with the standard cover parts form special bus duct runs of larger capacity than the standard bus duct runs produced by combining the cover parts only, the combination of the standard cover parts and the special spacer parts producing bus duct runs which though of larger capacity than the standard bus duct runs can nevertheless accommodate and mount standard plugs interchangeably and without modification of the plugs, and means for supporting the special spacer parts directly from fixed structure and means for supporting the bus bars directly from the special spacer parts, the standard cover parts being removable from the bus duct as a whole without disturbing the mounted special spacer parts and the bus bars supported thereby.

4. In an electrical distribution system, a bus duct run including central spacer sections, duplicated identical cover pans on opposite sides thereof, each having plug entrances and plug mounting formations, bus bar insulators and supports in and removably associated with the cover pans, and bus bars supported on said supports, the bus bar insulators and supports being secured directly to the central spacer sections, and means also secured directly to the central spacer sections for supporting the bus duct from fixed structure, the cover pans being removably secured to and mounted on the central spacer sections.

5. An electrical distribution system of the bus duct and plug type comprising a duct having its top and bottom walls formed of duplicated identical cover pans having outwardly flanged side walls, spacer sections forming side walls of the duct and disposed between the adjacent side walls of the cover pans and having flanges mating with the adjacent flanges of the cover pans, means removably securing the flanges to one another to form a duct, the pan flanges being complementarily formed so that they may be mated and intersecured to form a duct of small cross section without the spacer sections, each pan section having plug entrance holes for prongs of plugs mounted on the duct through the medium of the pan flanges, and bus bars supported in the duct in a position to be accessible to the plug prongs through the pan entrance holes.

6. An electrical distribution system of the bus duct and plug type comprising a duct having its top and bottom walls formed of duplicated identical cover pans having outwardly flanged side walls, spacer sections forming side walls of the duct and disposed between the adjacent side walls of the cover pans and having flanges mating with the adjacent flanges of the cover pans, means removably securing the flanges to one another to form a duct, the pan flanges being complementarily formed so that they may be mated and intersecured to form a duct of small cross section without the spacer sections, each pan section having plug entrance holes for prongs of plugs mounted on the duct through the medium of the pan flanges, and bus bars supported in the duct on the spacer sections and in a position to be accessible to the plug prongs through the pan entrance holes, and means secured to the spacer sections for supporting the duct from fixed structure.

WILLIAM H. FRANK.
JOSEPH W. HARPER.